United States Patent
Kanetomo

(10) Patent No.: US 8,782,663 B2
(45) Date of Patent: Jul. 15, 2014

(54) TERMINAL DEVICE, COMMUNICATION METHOD USED IN THE TERMINAL DEVICE AND RECORDING MEDIUM

(75) Inventor: Dai Kanetomo, Minato-ku (JP)

(73) Assignee: NEC Corporation, Tokyo (JP)

(*) Notice: Subject to any disclaimer, the term of this patent is extended or adjusted under 35 U.S.C. 154(b) by 183 days.

(21) Appl. No.: 13/266,390

(22) PCT Filed: Apr. 21, 2010

(86) PCT No.: PCT/JP2010/057522
§ 371 (c)(1),
(2), (4) Date: Oct. 26, 2011

(87) PCT Pub. No.: WO2010/131579
PCT Pub. Date: Nov. 18, 2010

(65) Prior Publication Data
US 2012/0047515 A1    Feb. 23, 2012

(30) Foreign Application Priority Data
May 11, 2009  (JP) .................. 2009-115048

(51) Int. Cl.
G06F 9/46    (2006.01)
(52) U.S. Cl.
USPC ...................................................... 718/107
(58) Field of Classification Search
USPC .................. 719/310–320; 718/107
See application file for complete search history.

(56) References Cited

FOREIGN PATENT DOCUMENTS

| JP | 2-220138 A | 9/1990 |
|---|---|---|
| JP | 2677175 B2 | 11/1997 |
| JP | 2004-348437 A | 12/2004 |
| JP | 2005-347894 A | 12/2005 |
| JP | 2007-72969 A | 3/2007 |
| JP | 3981059 B2 | 9/2007 |
| JP | 2008-40642 A | 2/2008 |
| JP | 2009-15400 A | 1/2009 |

OTHER PUBLICATIONS

Office Action, dated Jun. 11, 2013, issued by the Japanese Patent Office in counterpart Japanese Patent Application No. 2011-513306.
Sakai, Koichi, et al., "Evaluation for Guarantee of Service Processing by Regulating Processor Use in Library," Information Processing Society of Japan, Oct. 8, 2008, vol. 2008, No. 8, pp. 361-366.
Takahashi, Hidekazu, "Evolution of operability and tone quality—Environment of formal introduction thereof is ready," Nikkei Communications, Nikkei BP, No. 458 Mar. 15, 2006, pp. 54-58.

Primary Examiner — Diem Cao
(74) Attorney, Agent, or Firm — Sughrue Mion, PLLC

(57) ABSTRACT

The present invention relates to a terminal device having an operation system and is capable of using a first application program for use in real time communication and a second application program for another purpose simultaneously on the operation system, the terminal device is characterized by being provided with a means for setting interval between system calls which calculates a frequency of system call executions when the issuance of the system call to the operation system by the second application program is simultaneously executed during the real time communication by the first application program, and when the execution frequency has exceeded a predetermined threshold, sets an execution interval time between the system calls to a given length of time or more.

12 Claims, 9 Drawing Sheets

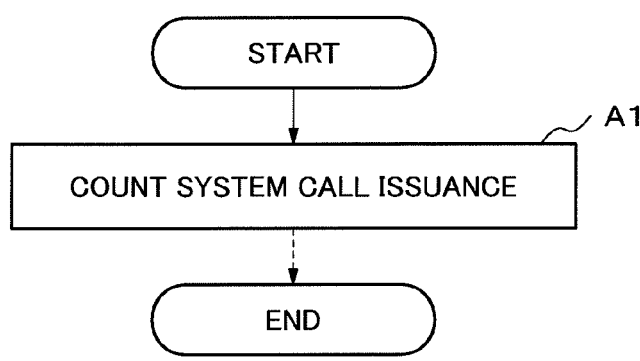
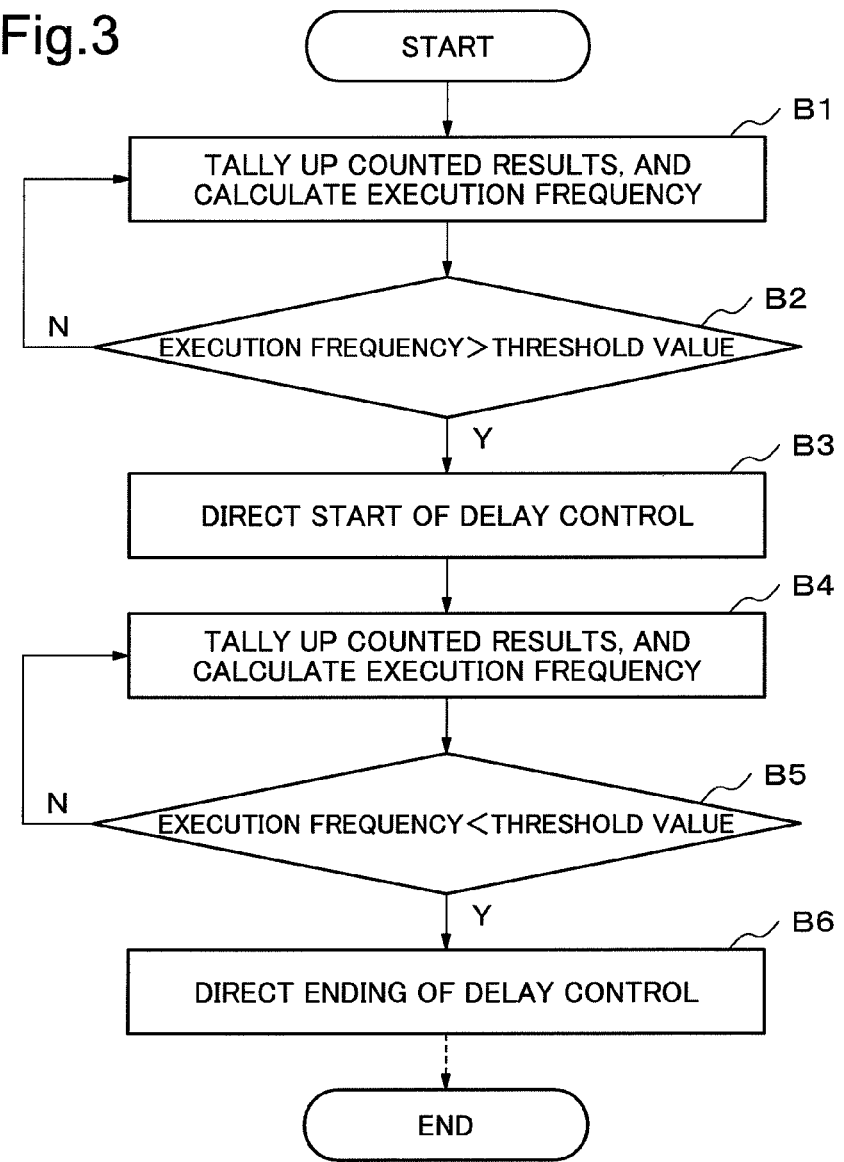

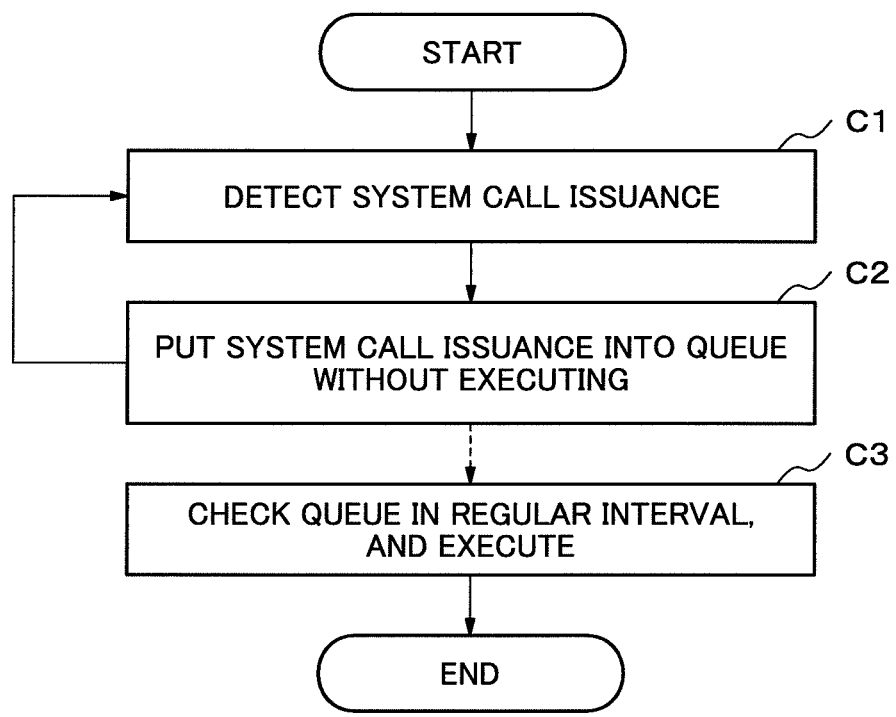

TERMINAL DEVICE, COMMUNICATION METHOD USED IN THE TERMINAL DEVICE AND RECORDING MEDIUM

CROSS REFERENCE TO RELATED APPLICATIONS

This application is a National Stage of International Application No. PCT/JP2010/057522 filed on Apr. 21, 2010, which claims priority from Japanese Patent Application No. 2009-115048, filed on May 11, 2009, the contents of all of which are incorporated herein by reference in their entirety.

TECHNICAL FIELD

The present invention relates to a terminal device, a communication method used in the terminal device and a communication control program. For example, by using a general purpose terminal device such as a personal computer, the present invention relates to the terminal device, the communication method used in the terminal device and the communication control program suitable for a case where an application program of real time communication for performing transmission and reception of media like video and audio and an application program of another purpose are used simultaneously on the terminal device.

BACKGROUND ART

When real time communication is performed on a terminal device for media such as video and audio, as data is transmitted and received continuously, it is also necessary to perform processing continuously by the terminal device without being delayed. However, when processing is delayed, deterioration in quality such as sound break or stop of playback occurs. On the other hand, as a terminal device, for example, when a general purpose one like a personal computer is used, there may be a case where application of real time communication and application of another purpose are used simultaneously on the terminal device. In order to perform data processing of video and audio in this state without interruption, technology which sets the execution priority of this data processing higher than application of another purpose is proposed.

As this kind of relating art, for example, an electronic device disclosed in patent document 1 is known.

In this electronic device, first, a TV viewer is started. Next, it is confirmed whether a television image display is a full screen (full display) mode by a thread priority determination part. In a case where the television image display is the full screen mode, the thread priority determination part increases the priority of the executed thread in the image processing. On the other hand, in a case where it is not the full screen mode, the thread priority determination part lowers the priority of the thread. In the situation that the TV viewer is being used, the thread priority determination part performs the above mentioned processing at timing when the size of the television image display is changed, and changes the priority of the thread dynamically. The thread priority determination part sets the priority of image processing higher than GUI (Graphical User Interface) control according to the size of the television image display, and prevents dropping frames and image degradation.

Further, a computer system disclosed in patent document 2 measures the number of times of reception interruption from the NIC (Network Interface Card) and the utilization time of CPU (central processing unit) caused by the reception interruption. These measurement results are reset in a fixed time period. Whenever interruption occurs, the computer system compares the measurement result of the number of times of interruption with a threshold value. When the measurement result is exceeding the threshold value, the computer system prohibits the reception processing and discards received packets. Similarly, the computer system compares the measurement result of the utilization time of CPU with a threshold value. When the measurement result is exceeding the threshold value, the computer system prohibits the reception processing and discards received packets.

Further, in an outside event detection system of a computer system disclosed in patent document 3, an external event holding means holds occurrences of a plurality of external events respectively, and outputs an event occurrence notice signal for notifying of event occurrences corresponding to the external events. A delay means delays an output of an interruption signal based on the event occurrence notice signal for a fixed period of time when having received any one of the event occurrence notice signals. The delay means outputs an interruption signal in which the interruption signal based on the event occurrence notice signal and the other event occurrence signals having been received during the delay time period are consolidated. A central processing unit, when having received the above mentioned interruption signal, performs processing successively for the external events held by the above mentioned external event holding means, and outputs a reset command corresponding to a first reset signal with completion of the each processing. The central processing unit outputs a reset command corresponding to a second reset signal when having completed all processing. A reset means receives the reset commands of the central processing unit, and gives the first reset signal that individually releases information held in the external event holding means and the second reset signal that releases operation of the delay means.

Further, in an image processing device disclosed in patent document 4, an event communication means accumulates an external event inputted from outside in an event storage means, outputs event notification and outputs an interruption signal. An event counting means counts the number of event notifications. A time counter counts the elapsed time from the time when the event notification was outputted. A centralized processing means outputs an operating command based on the interruption signal. An event processing execution means executes event processing. A delay means outputs the interruption signal to the centralized processing means with delaying based on the counted number of the event notifications and the elapsed time.

Patent document 1: Japanese Patent Application Publication No. 2008-040642
Patent document 2: Japanese Patent Application Publication No. 2005-347894
Patent document 3: Japanese Patent No. 2677175
Patent document 4: Japanese Patent No. 3981059

DISCLOSURE OF THE INVENTION

Problem to be Solved by the Invention

However, the following problems are included in the above mentioned related arts.

That is, in the electronic device disclosed in patent document 1, even when it has set higher priority for the execution priority of the data processing of video and audio to which priority should be given than the execution priority of the processing of application which is executed simultaneously (hereinafter, referred to as "the concurrent execution AP"), there may be a case where deterioration of the sound quality and the image quality due to interruption of data processing of video and audio would occur depending on behavior of the concurrent execution AP. In order to describe the reason, it considers a case where OS (operation system) is used in the general purpose terminal device, and the concurrent execution AP with relatively lower execution priority than the data processing of video and audio is being executed. In this case, when a system call (interface for invoking functions of OS) is issued continuously, the processing by OS is executed with higher priority than the processing of general applications. As a result, the processing of the concurrent execution AP is given priority over the data processing of video and audio to which high execution priority is being set among the general applications, and the data processing of video and audio is delayed.

The computer system disclosed in patent document 2 measures the number of times of reception interruption from the NIC, and whenever interruption occurs, it compares the measurement result of the number of times of interruption with a threshold value. This configuration is different from the configuration of the present invention.

In the external event detection system disclosed in patent document 3, when the delay means has received the event occurrence notice signal, it delays an output of the interruption signal based on the event occurrence notice signal for a fixed period of time. The delay means outputs the interruption signal in which the interruption signal based on the event occurrence notice signal and the other event occurrence signals having been received during the delay time period are consolidated. This configuration is different from the configuration of the present invention.

In the image processing device disclosed in patent document 4, when the actual elapsed time from the event occurrence time has reached the delay time for the event accumulated in the event storage means, the event processing execution means executes the processing relating to the event. This configuration is different from the configuration of the present invention.

The present invention has been invented in view of the above mentioned circumstances, and it intends to provide a terminal device, a communication method used in the terminal device and a communication control program, which prevent the quality of sounds and images of real time communication from being deteriorated by behavior of the application which is executed simultaneously.

Means for Solving a Problem

The terminal device according to the present invention is a terminal device having an operation system and is capable of using a first application program for use in real time communication and a second application program for another purpose simultaneously on the operation system, and the terminal device is characterized by being provided with a means for setting interval between system calls which calculates a frequency of system call executions when issuance of the system call to the operation system by the second application program is simultaneously executed during the real time communication by the first application program, and when the execution frequency has exceeded a predetermined threshold, sets an execution interval time between the system calls to a given length of time or more.

The communication method according to the present invention is a communication method used in a terminal device which having an operation system and is capable of using a first application program for use in real time communication and a second application program for another purpose simultaneously on the operation system, and the method is characterized by, calculating a frequency of system call executions by a means for setting interval between system calls when issuance of the system call to the operation system by the second application program is simultaneously executed during the real time communication by the first application program, and setting an execution interval time between the system calls to a given length of time or more when the execution frequency has exceeded a predetermined threshold.

The communication control program according to the present invention is characterized by causing a computer to execute time interval setting processing steps including, calculating a frequency of system call executions by a means for setting interval between system calls when issuance of the system call to an operation system by a second application program is simultaneously executed during real time communication by a first application program, and setting an execution interval time between the system calls to a given length of time or more when the frequency has exceeded a predetermined threshold.

Effect of the Invention

According to the configuration of the present invention, for example, it produces an advantageous effect that it can prevent the quality of real time communication by the first application program from being deteriorated even when the system call is executed continuously.

BRIEF DESCRIPTION OF THE DRAWINGS

FIG. 2 is a flowchart describing operation of the system call counter means 121, 122.

FIG. 3 is a flowchart describing operation of the counter summary means 15.

FIG. 4 is a flowchart describing operation of the system call queue means 131, 132.

THE PREFERRED EMBODIMENTS FOR CARRYING OUT THE INVENTION

It provides a terminal device in which a means for setting interval between system calls sets an execution interval time between system calls to a value that can prevent deterioration in quality of a real time communication program caused by the system call of the second application program.

Further, according to a preferred embodiment of the present invention, the means for setting interval between system calls includes a system call measurement means which measures the number of system call executions to the operation system by the second application program, an execution interval control determination means which tallies up the number of system call executions measured by the system call measurement means in a predetermined cycle, calculates an execution frequency of the system call based on the sum of the number of system call executions and compares the execution frequency with a threshold value, and determines whether it is necessary or not to control an execution interval time between the system calls based on the comparison result, and an interval time setting means which sets the execution interval time between the system calls to a given length of time or more when the determination result by the execution interval control determination means indicates that the execution interval time is needed to be controlled.

Further, according to a preferred embodiment of the present invention, the interval time setting means includes an execution interval storage means which stores a predetermined execution interval time between the system calls, a executing system call storage means which stores, by a First-In First-Out method, the issuance of the system call which is waiting for execution, and a system call issuance means which stores the issuance of the system call in the executing system call storage means successively, and at the same time, executes the issuance of the system call in order of storage in the executing system call storage means and by the execution interval time stored in the execution interval storage means.

Further, according to a preferred embodiment of the present invention, it is provided with a maximum delay time storage means which stores a predetermined maximum delay time, and an interval timing adjusting means which periodically counts the number of system call executions being stored and waiting for execution in the executing system call storage means, and adjusts the time of execution interval of the system call issuance means so that the time until the last issuance of the system call which is waiting for execution has actually been executed may fall within the range of the maximum delay time.

Exemplary Embodiment 1

Figure 1:
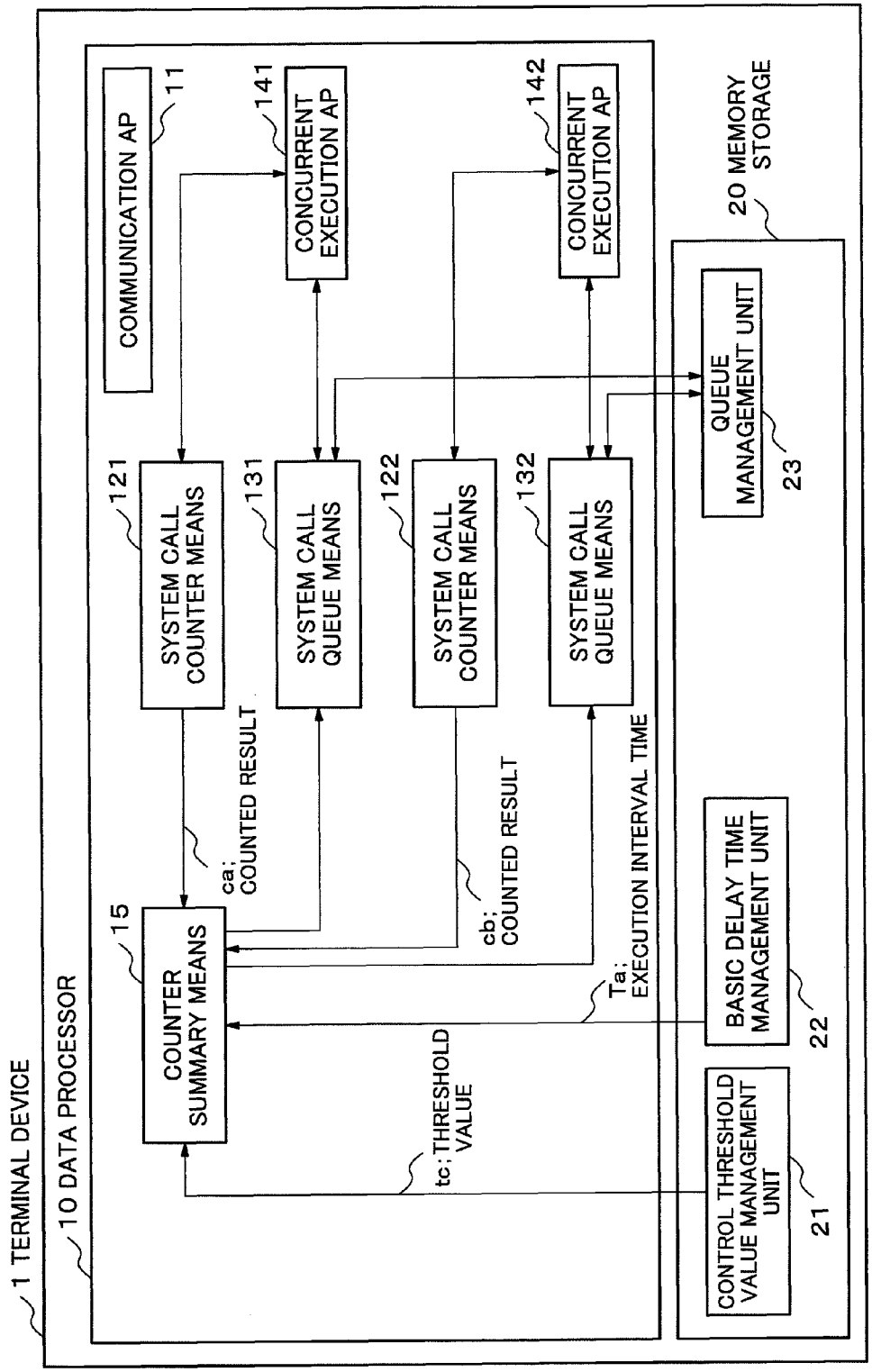
FIG. 1 is a block diagram showing the configuration of a primary part of the terminal device according to the first exemplary embodiment of the present invention.

FIG. 1 is a block diagram showing the configuration of a primary part of the terminal device according to the first exemplary embodiment of the present invention.

The terminal device of this exemplary embodiment includes an operation system (OS), and is capable of using a first application program for use in real time communication and a second application program for another purpose simultaneously on the OS. As shown in the figure, the terminal device 1 includes a data processor 10 and a memory storage 20. The data processor 10 includes a communication AP (application) 11, system call counter means 121, 122, system call queue means 131, 132, concurrent execution APs (applications) 141, 142 and a counter summary means 15. The memory storage 20 includes a control threshold value management unit 21, a basic delay time management unit 22 and a queue management unit 23.

The communication AP 11 is the first application program for use in real time communication. The communication AP 11 performs communication between users of the terminal devices by communicating with the communication AP of other terminal device which is the same configuration as the terminal device 1. The concurrent execution APs 141, 142 are the second application programs for another purpose. Each of the concurrent execution APs 141, 142 can be used simultaneously with the communication AP 11. The system call counter means 121, 122 measure the number of system call executions originated by the concurrent execution APs 141, 142 to the above mentioned operation system (OS) respectively, and output as counted results ca, cb.

The control threshold value management unit 21 gives a threshold value tc to the counter summary means 15. The basic delay time management unit 22 stores a predetermined execution interval time Ta of the issuance of the system call. The queue management unit 23 stores the issuance of the system call, which is waiting for execution, by a First-In First-Out method. The counter summary means 15 collects the number of system call executions (counted results ca, cb) measured by the system call counter means 121, 122 periodically, and tallies up the counted results ca, cb by the predetermined cycle. The counter summary means 15 calculates the number of system call executions in a certain period of time as an execution frequency of the system call based on the sum of the counted results ca, cb. The counter summary means 15 compares the calculated execution frequency with the threshold value tc having been given from the control threshold value management unit 21. The counter summary means 15 determines whether it is necessary or not to control an execution interval time between the system calls based on this comparison result. In this case, the counter summary means 15 retrieves the execution interval time Ta from the basic delay time management unit 22 and indicates to the system call queue means 131, 132 when the execution interval time between the system calls is needed to be controlled.

The system call queue means 131, 132 set the execution interval time between the system calls to a given length of time or more when the determination result by the counter summary means 15 indicates the necessity of control for the execution interval time. In this case, the system call queue means 131, 132 store the issuance of the system call in the queue management unit 23 successively. At the same time, the system call queue means 131, 132 execute the issuance of the system call according to the order of storage in the queue management unit 23 and by the execution interval time Ta stored in the basic delay time management unit 22. This execution interval time Ta is set to the value that can prevent deterioration in quality of the communication AP 11 caused by the system call of the concurrent execution APs 141, 142 to the operation system (OS).

In this terminal device 1, the data processor 10 is configured by a central processing unit as a computer and a memory. The data processor 10 is controlled based on a communication control program which constitutes the operation system (OS). And, by executing the communication control program on the memory by the central processing unit, it operates as each above mentioned means. The memory storage 20 is constituted by a hard disk, for example.

FIG. 2 is a flowchart describing operation of the system call counter means 121, 122, FIG. 3 is a flowchart describing operation of the counter summary means 15, and FIG. 4 is a flowchart describing operation of the system call queue means 131, 132.

The processing content of the communication method used in the terminal device of this exemplary embodiment will be described with reference to these figures.

This terminal device 1 calculates the execution frequency of the system call when the issuance of the system call to the operation system (OS) by the second application program (concurrent execution APs 141, 142) is executed simultaneously during real time communication by the first application program (communication AP 11). And, when the execution frequency has exceeded the predetermined threshold value tc, the execution interval time between the system calls is set to a given length of time or more (system call issuance execution interval setting processing). In this system call issuance execution interval setting processing, the execution interval time between the system calls is set to the given length of time or more of the value by which deterioration in quality of a real time communication program caused by the system call to the operation system (OS) by the second application program is prevented.

In the system call issuance execution interval setting processing, the system call counter means 121, 122 measure the number of system call executions to the operation system (OS) by the second application program (system call measurement processing). Next, the counter summary means 15 tallies up the number of system call executions measured by the system call measurement processing in the predetermined cycle. The counter summary means 15 calculates the execution frequency of the system call based on the sum of the number of system call executions. The counter summary means 15 compares the execution frequency with the threshold value tc of the control threshold value management unit 21. Further, the counter summary means 15 determines whether it is necessary or not to control the execution interval time between the system calls based on the comparison result (execution interval control determination processing). And, when the determination result by the execution interval control determination processing indicates that it needs the execution interval time to be controlled, the system call queue means 131, 132 set the execution interval time between the system calls to the given length of time or more (interval time setting processing).

In the interval time setting processing mentioned above, the basic delay time management unit 22 stores the predetermined execution interval time Ta of the issuance of the system call (execution interval memory processing). The queue management unit 23 stores the issuance of the system call, which is waiting for execution, by a First-In First-Out method (system call issuance memory processing). The system call queue means 131, 132 store the issuance of the system call in the queue management unit 23 successively. At the same time, the system call queue means 131, 132 execute the issuance of the system call according to the order of storage in the queue management unit 23 by the execution interval time Ta stored in the basic delay time management unit 22 (system call issuance processing).

That is, as shown in FIG. 2, the system call counter means 121, 122 always monitor the issuance of the system call originated by the concurrent execution APs 141, 142 during execution of real time communication by the communication AP 11, and count the number of the issuances (Step A1).

Next, as shown in FIG. 3, the counter summary means 15 tallies up the counted results ca, cb of the number of system call executions by the system call counter means 121, 122 in the predetermined cycle, and calculates the execution frequency (the number of the executed system calls per unit time) of the system call (Step B1). The counter summary means 15 compares the calculated execution frequency with the threshold value tc given from the control threshold value management unit 21 (Step B2).

The counter summary means 15 directs start of delay control to the system call queue means 131, 132 when the execution frequency has exceeded the threshold value tc (Step B3). At this time, the counter summary means 15 retrieves the execution interval time Ta of the issuance of the system call from the basic delay time management unit 22, and notifies the system call queue means 131, 132. After this, also, the counter summary means 15 calculates the execution frequency of the system call in a predetermined cycle (Step B4), and when the execution frequency has fallen below the threshold value tc (step B5), the counter summary means 15 directs the ending of the delay control to the system call queue means 131, 132 (Step B6).

As shown in FIG. 4, when having been directed start of the delay control from the counter summary means 15, and having detected the issuance of the system call by the concurrent execution APs 141, 142 (Step C1), the system call queue means 131, 132 put the issuance of the system call into an execution waiting queue of the queue management unit 23 without executing the issuance of the system call (Step C2). And, at the same time, the system call queue means 131, 132 execute the issuance of the system call being stored at the front of the execution waiting queue of the queue management unit 23 in a predetermined time interval (step C3). This execution interval of the issuance of the system call is indicated from the counter summary means 15 at the time of start of the delay control. After this, when it has an ending direction of the delay control from the counter summary means 15, the system call queue means 131, 132 perform execution of the issuance of the system call in the execution waiting queue by the predetermined time interval until the queue becomes empty, and end the delay control.

As above, in the first exemplary embodiment, when the issuance of the system call to the operation system by the concurrent execution APs 141, 142 is executed simultaneously during real time communication by the communication AP 11, the counter summary means 15 calculates the execution frequency of the system call. And, when the execution frequency has exceeded the predetermined threshold value tc, the system call queue means 131, 132 set the execution interval time between the system calls to a given length of time or more. Therefore, the terminal device 1 of this exemplary embodiment can prevent deterioration in quality of communication which is caused by continuous execution of high priority OS processing.

Exemplary Embodiment 2

Figure 5:
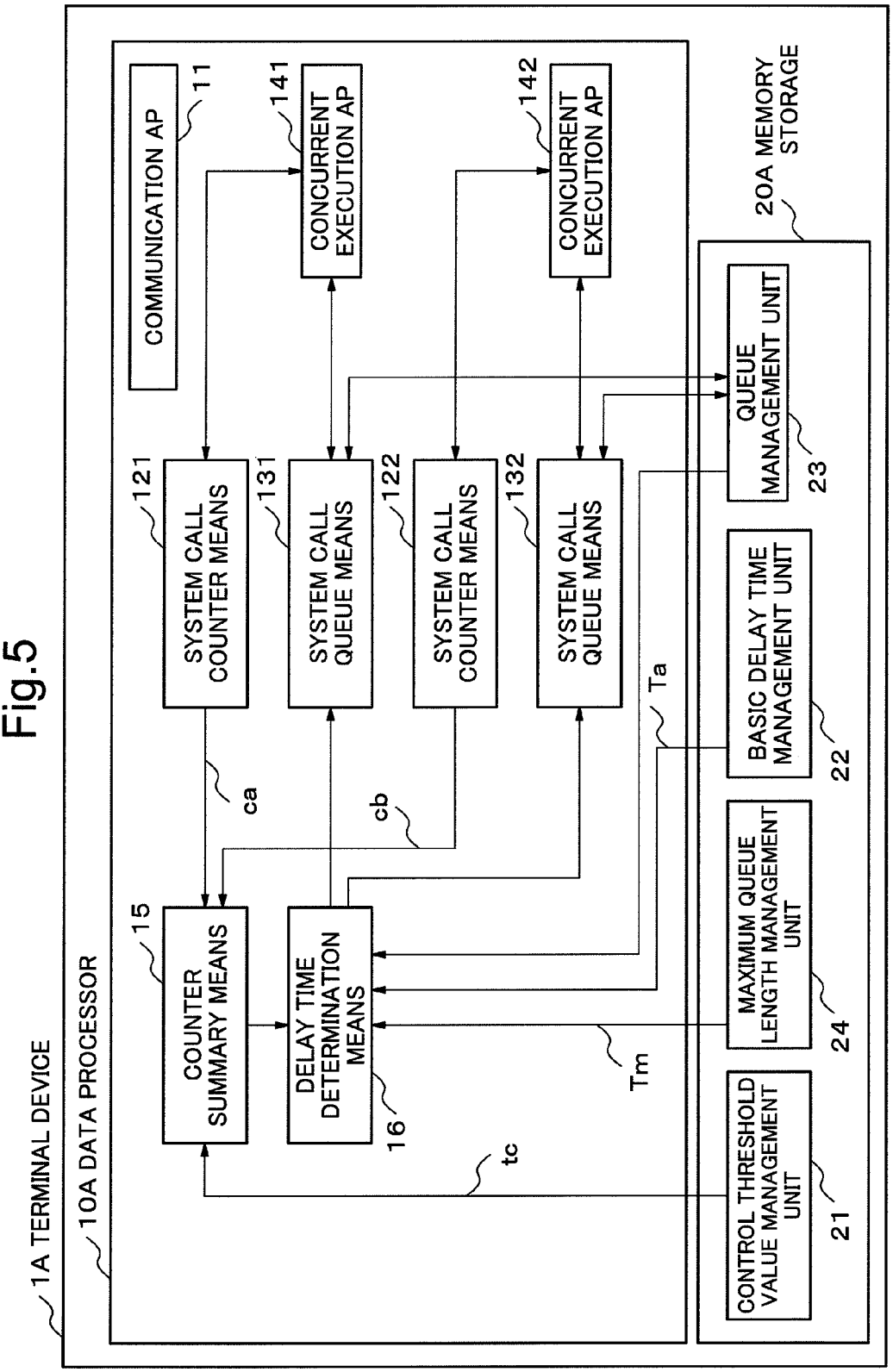
FIG. 5 is a block diagram showing the configuration of a primary part of the terminal device according to the second exemplary embodiment of the present invention.

FIG. 5 is a block diagram showing the configuration of a primary part of the terminal device according to the second exemplary embodiment of the present invention.

As shown in FIG. 5, in place of the data processor 10 and the memory storage 20 in FIG. 1 showing the first exemplary embodiment, the terminal device 1A of this exemplary embodiment includes a data processor 10A and a memory storage 20A each having different configuration. The data processor 10A includes a delay time determination means 16 in addition to the configuration of the data processor 10. The memory storage 20A includes a maximum queue length management unit 24 in addition to the configuration of the memory storage 20. The maximum queue length management unit 24 stores a predetermined maximum delay time Tm. The delay time determination means 16 periodically counts the number of system call executions being stored and waiting for execution in the queue management unit 23. When the counter summary means 15 needs control of the execution interval time between the system calls to the system call queue means 131, 132, the delay time determination means 16 adjusts the time of execution interval of the system call queue means 131, 132 so that the time until the last issuance of the system call which is waiting for execution has actually been executed may fall within the range of the maximum delay time Tm. As for the rest of configuration, it is the same as FIG. 1.

Figure 6:
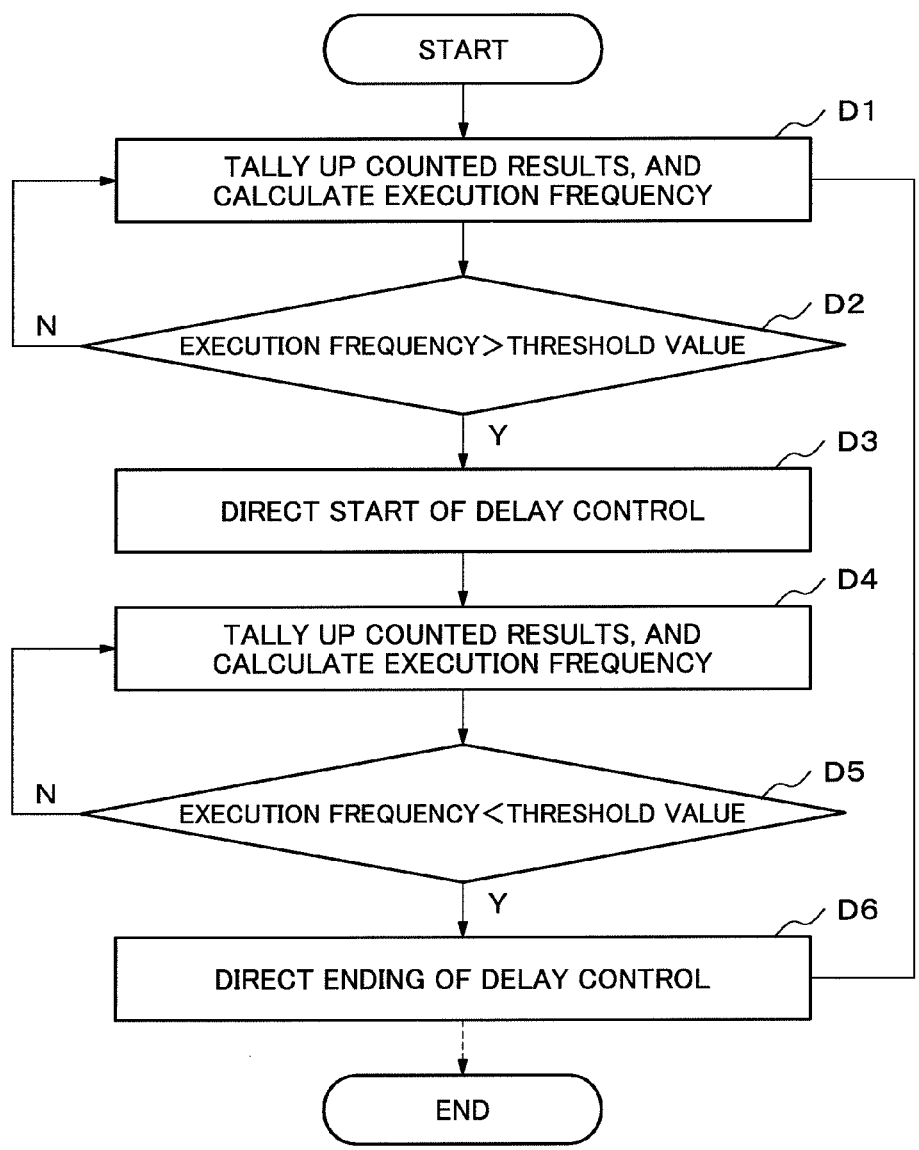
FIG. 6 is a flowchart describing operation of the counter summary means 15.
Figure 7:
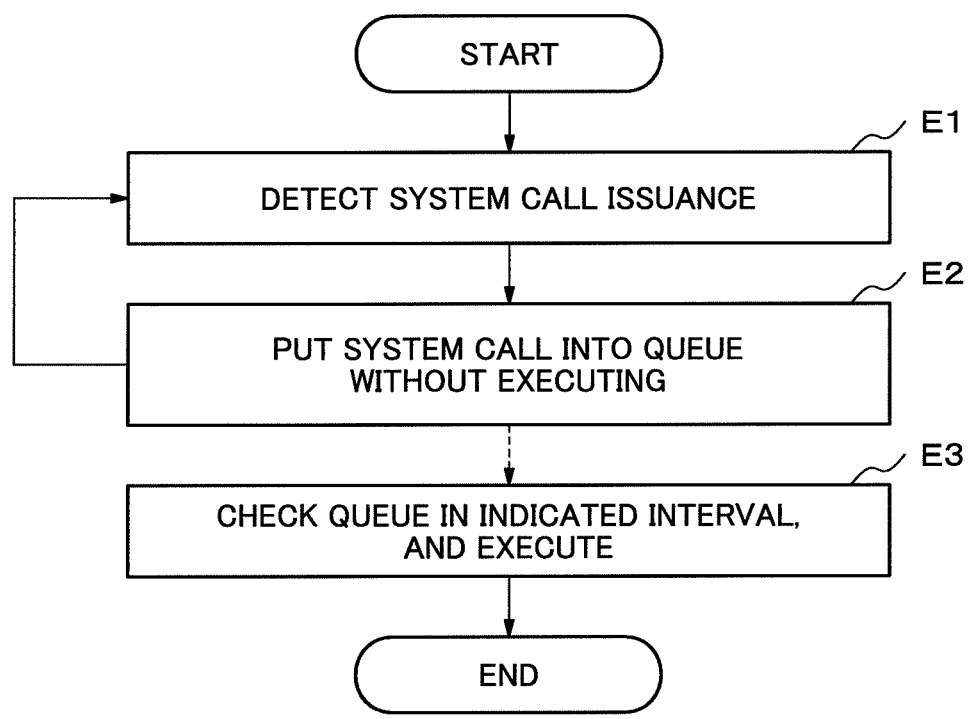
FIG. 7 is a flowchart describing operation of the system call queue means 131, 132.
Figure 8:
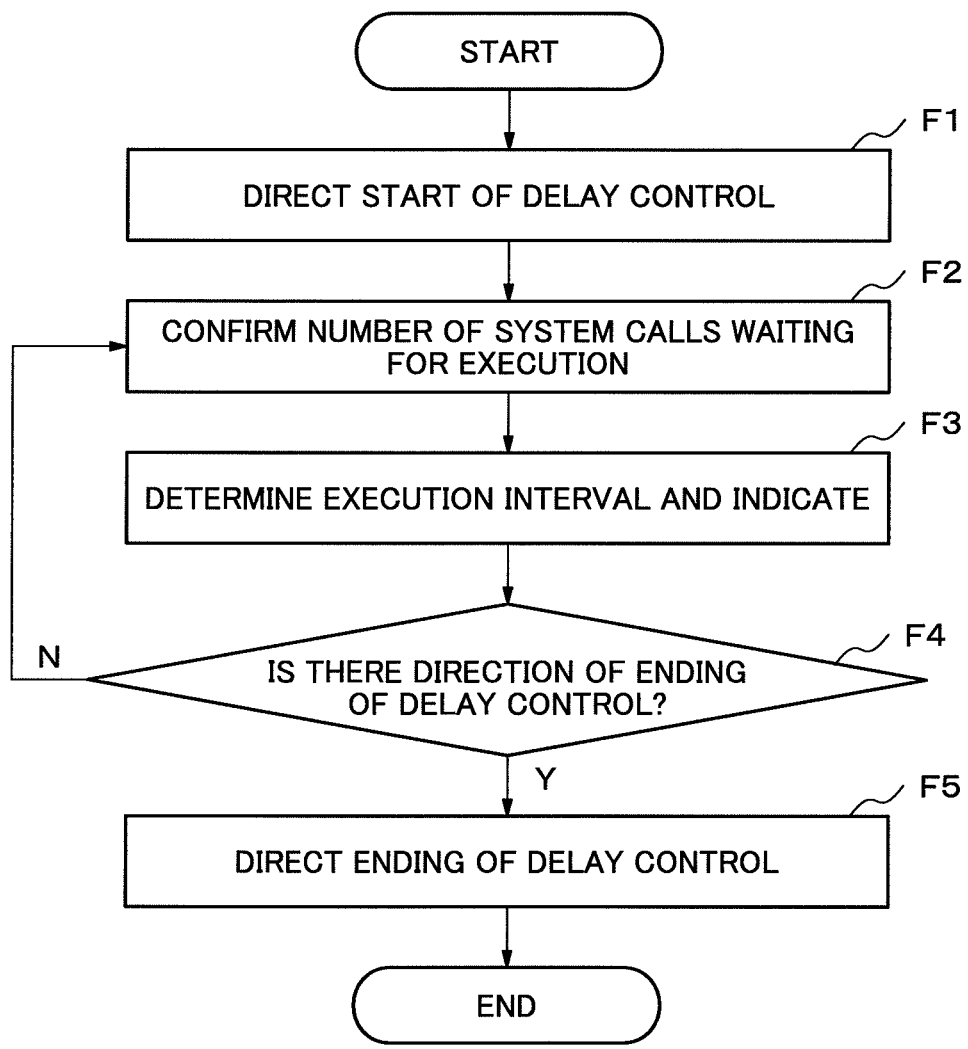
FIG. 8 is a flowchart describing operation of the delay time determination means 16.

FIG. 6 is a flowchart describing operation of the counter summary means 15, FIG. 7 is a flowchart describing operation of the system call queue means 131, 132, and FIG. 8 is a flowchart describing operation of the delay time determination means 16.

The processing content of the communication method used in the terminal device of this exemplary embodiment will be described with reference to these figures.

In this terminal device 1A, the maximum queue length management unit 24 stores the predetermined maximum delay time Tm. The delay time determination means 16 periodically counts the number of system call executions being stored and waiting for execution in the queue management unit 23. Further, the delay time determination means 16 adjusts the time of execution interval of the system call queue means 131, 132 so that the time until the last issuance of the system call which is waiting for execution has actually been executed may fall within the range of the maximum delay time Tm (interval time adjusting processing).

That is, as shown in FIG. 6, the counter summary means 15 tallies up the counted results ca, cb of the number of system call executions by the system call counter means 121, 122 in the predetermined cycle, and calculates the execution frequency of the system call (Step D1). Further, the counter summary means 15 compares this execution frequency with the threshold value tc given from the control threshold value management unit 21 (Step D2). When the execution frequency has exceeded the threshold value tc, the counter summary means 15 directs start of delay control to the delay time determination means 16 (Step D3). At this time, the delay time determination means 16 retrieves the execution interval time Ta of the issuance of the system call from the basic delay time management unit 22. After this, also, the counter summary means 15 calculates the execution frequency of the issuance of the system call in a predetermined cycle (Step D4). When the execution frequency has fallen below the threshold value tc (Step D5), the counter summary means 15 directs the ending of the delay control to the delay time determination means 16 (Step D6).

As shown in FIG. 8, when having been directed start of the delay control from the counter summary means 15, the delay time determination means 16 directs start of the delay control to the system call queue means 131, 132 (step F1). As the execution interval at that time, the delay time determination means 16 also indicates the execution interval time Ta stored in the basic delay time management unit 22. Subsequently, the delay time determination means 16 confirms the number of the system call issuances waiting for execution in the queue management unit 23 (Step F2), and determines the execution interval time of the system call queue means 131, 132. The delay time determination means 16 indicates the determined execution interval time between the system calls to the system call queue means 131, 132 (Step F3). In this case, when the quotient obtained by dividing the maximum delay time Tm stored in the maximum queue length management unit 24 by the number of the system call issuances waiting for execution is larger than the execution interval time Ta stored in the basic delay time management unit 22, the delay time determination means 16 determines this execution interval time Ta as the execution interval time. When it is not so, the delay time determination means 16 determines the value of the quotient as the execution interval time. Further, while determination and indication of this execution interval time are repeated periodically, when having received the delay control ending direction from the counter summary means 15 (Step F4), the delay time determination means 16 directs the ending of the delay control to the system call queue means 131, 132 (Step F5). As shown in FIG. 7, when having been directed start of the delay control from the delay time determination means 16, and having detected the issuance of the system call originated by the concurrent execution APs 141, 142 (Step E1), the system call queue means 131, 132 can put the issuance of the system call into an execution waiting queue of the queue management unit 23 without executing the system call (Step E2). And, at the same time, the system call queue means 131, 132 execute the issuance of the system call being stored at the front of the execution waiting queue of the queue management unit 23 in a predetermined time interval (step E3). This execution interval of the execution of the system call is indicated from the delay time determination means 16 at the time of start of the delay control. After this, when it has an ending direction of the delay control from the delay time determination means 16, the system call queue means 131, 132 perform execution of the issuance of the system call in the execution waiting queue by the predetermined time interval until the queue becomes empty, and end the delay control.

As above, in the second exemplary embodiment, the delay time determination means 16 periodically counts the number of system call executions waiting for execution which is stored in the queue management unit 23. And, the delay time determination means 16 adjusts the time of execution interval of the system call queue means 131, 132 so that the time until the last issuance of the system call which is waiting for execution has actually been executed may fall within the range of the maximum delay time Tm. Therefore, in addition to the advantage of the first exemplary embodiment, the terminal device 1A of this exemplary embodiment can prevent an execution time limit of the system call from being exceeded due to the delay control even in a case where the time until the ending of the system call execution is limited within a predetermined time period (that is, a time-out is set).

Exemplary Embodiment 3

Figure 9:
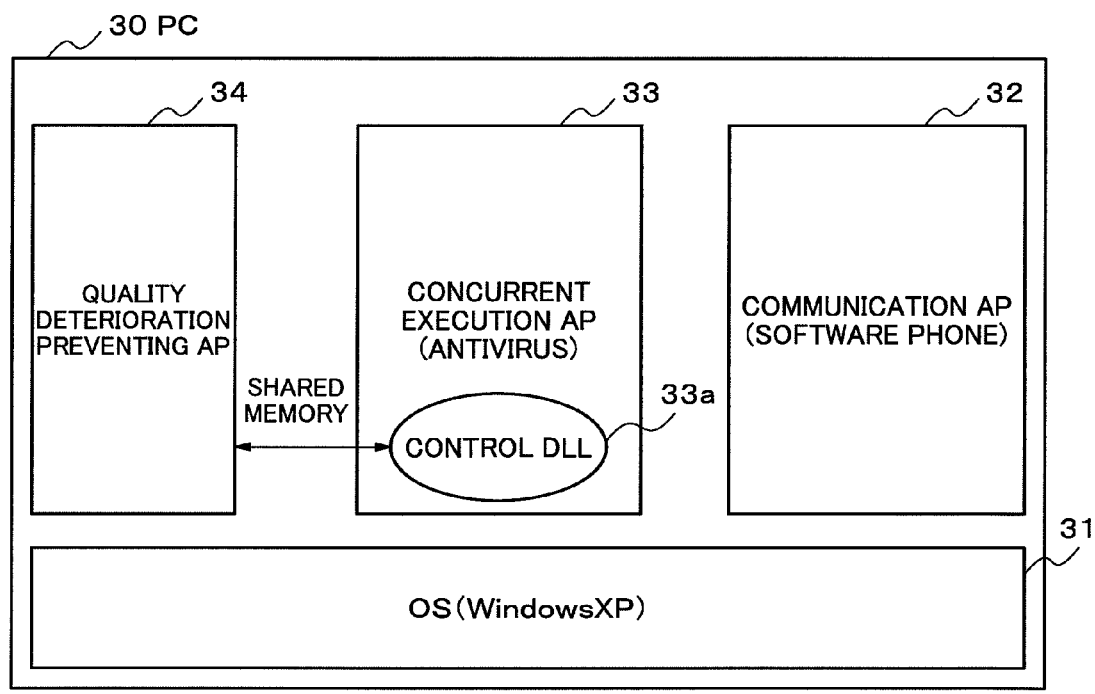
FIG. 9 is a block diagram showing the configuration of a primary part of the terminal device according to the third exemplary embodiment of the present invention.

FIG. 9 is a block diagram showing the configuration of a primary part of the terminal device according to the third exemplary embodiment of the present invention.

The terminal device of this exemplary embodiment corresponds to the terminal device 1 in FIG. 1 showing the first exemplary embodiment. As shown in FIG. 9, the terminal device of this exemplary embodiment is a PC (personal computer) 30. The terminal device of this exemplary embodiment includes an operation system (OS) 31, a communication AP 32 and a concurrent execution AP 33 and a quality deterioration preventing AP 34. For example, the operation system (OS) 31 is constituted by "Windows (registered trademark) XP" of Microsoft corporation in the US. For example, the communication AP 32 is constituted by "software phone" (IP telephone realized as software of a PC) and operates on the OS 31. The quality deterioration preventing AP 34 operates on the OS 31, and includes the counter summary means 15, the control threshold value management unit 21 and the basic delay time management unit 22 in FIG. 1.

For example, the concurrent execution AP 33 is constituted by "antivirus" (software for detecting and removing computer viruses) and operates on the OS 31. The system call counter means 121, 122, the system call queue means 131, 132 and the queue management unit 23 in FIG. 1 are implemented as a control DLL (Dynamic Link Library) 33a which has been injected to the concurrent execution AP 33 ("antivirus"), and it has a shared memory with the quality deterioration preventing AP 34. The control DLL 33a having been injected hooks the issuance of the system call of "antivirus", and performs operation of the system call counter means 121, 122 and the system call queue means 131, 132. In particular, according to this exemplary embodiment, it is supposed that the system call which is a hook target is "VirtualQueryEx" for acquiring memory information. This "VirtualQueryEx" acquires information relating to the pages in the range in the virtual address space of a designated process.

While communicating by the communication AP 32 ("software phone") in this PC 30, when the concurrent execution AP 33 ("antivirus") tries to issue a system call of a target, the issuance is hooked by the control DLL 33*a*. Generally, the control DLL 33*a* only counts the number of times of hooks at the time of hooking (Step A1 in FIG. 2), and immediately executes the original issuance of the system call. The counted result by the control DLL 33*a* is acquired by the quality deterioration preventing AP 34 once every 1 second. The quality deterioration preventing AP 34 calculates the execution frequency of the system call for every second (Step B1 in FIG. 3). When this execution frequency has exceeded 10 times per second which is the predetermined control threshold values (Step B2 in FIG. 3), the quality deterioration preventing AP 34 directs start of the delay control and the execution interval time (for example, 100 milliseconds) to the control DLL 33*a* (Step B3 in FIG. 3). After having started the delay control, and when having hooked the target system call, the control DLL 33*a*, without immediately executing (Step C1 in FIG. 4), once stores the contents in the execution waiting queue of the queue management unit 23 (Step C2 in FIG. 4).

On the other hand, the control DLL 33*a* executes the system call stored in the execution waiting queue, for example, for every 100 milliseconds from the front of the queue (step C3 in FIG. 4). The quality deterioration preventing AP 34 acquires the number of times of hooks and calculates the execution frequency also during the delay control execution by the control DLL 33*a* (Step B4 in FIG. 3). When the execution frequency has fallen below 10 times per second (step B5 in FIG. 3), the quality deterioration preventing AP 34 directs the ending of the delay control to the control DLL 33*a* (Step B6 in FIG. 3). The control DLL 33*a* ends the delay control after having continued until the execution waiting queue of the queue management unit 23 had become empty. As a result, it is possible to prevent deterioration in quality of communication during talking by the communication AP 32 ("software phone").

Figure 10:
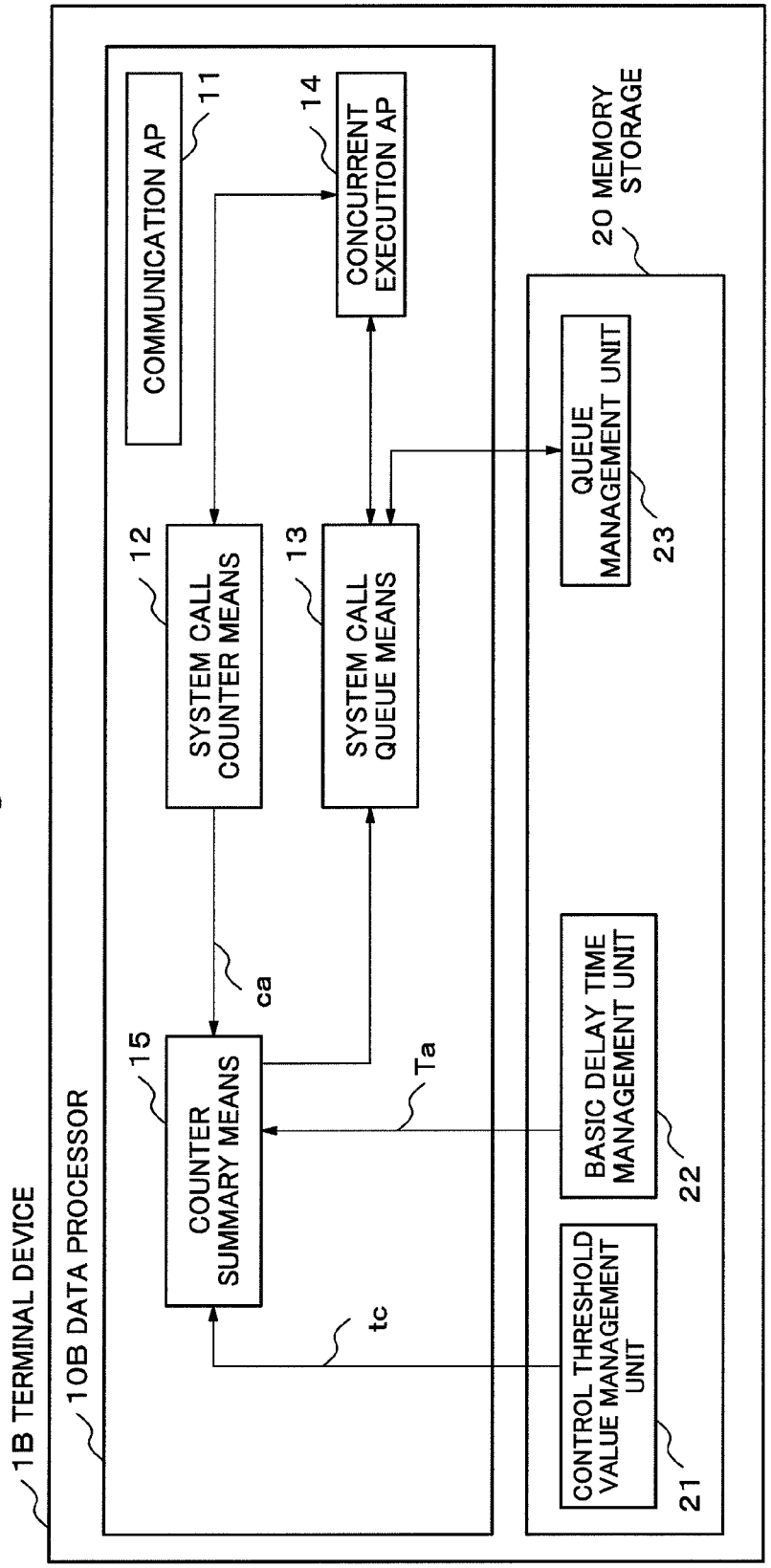
FIG. 10 is a figure showing a modification example of the terminal device.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention. For example, according to each exemplary embodiment mentioned above, although there exist two of the concurrent execution APs 141, 142 in the data processors 10, 10A, the number may be even one or more than two. For example, as shown in FIG. 10, in the terminal device 1B, one each of the system call counter means 12, the system call queue means 13 and the concurrent execution AP 14 are provided in the data processor 10B.

A plurality of concurrent execution APs may be controlled by one each of the system call counter means and the system call queue means.

The whole or part of the exemplary embodiments disclosed above can be described as, but not limited to, the following supplementary notes.

(SUPPLEMENTARY NOTE 1) A frequency of system call executions by a means for setting interval between system calls when issuance of the system call to an operation system by a second application program is simultaneously executed during real time communication by a first application program, and setting an execution interval time between the system calls to a given length of time or more when the execution frequency has exceeded a predetermined threshold.

(SUPPLEMENTARY NOTE 2) The communication control program according to supplementary note 1, wherein the time interval setting processing steps include, setting the execution interval time between the system calls to a value of the given length of time or more that can prevent deterioration in quality of a real time communication program caused by the system call of the second application program.

(SUPPLEMENTARY NOTE 3) The communication control program according to supplementary, note 1 or supplementary note 2, wherein the program for causing a computer in the time interval setting processing steps to execute the processing steps of, a system call measurement processing step, by a system call measurement means, for measuring the number of system call executions to the operation system by the second application program, an execution interval control determination processing step, by an execution interval control determination means, for tallying up the number of system call executions measured by the system call measurement means in a predetermined cycle, calculating the execution frequency of the system call based on the sum of the number of system call executions and comparing the execution frequency with a threshold value, and determining whether it is necessary or not to control an execution interval time between the system calls based on the comparison result, and an interval time setting processing step, by an interval time setting means, for setting the execution interval time between the system calls to the given length of time or more when the determination result by the execution interval control determination means indicates that the execution interval time is needed to be controlled.

(SUPPLEMENTARY NOTE 4) The communication control program according to supplementary note 3, wherein the program for causing a computer in the time interval setting processing steps to execute the processing steps of, an execution interval storage processing step, by an execution interval storage means, for storing a predetermined execution interval time of the issuance of the system call, a system call issuance storage processing step, by a executing system call storage means, for storing, by a First-In First-Out method, the issuance of the system call which is waiting for execution, and a system call issuance processing step, by a system call issuance means, for storing the issuance of the system call in the executing system call storage means successively, and at the same time, executing the issuance of the system call in order of storage in the executing system call storage means and by the execution interval time stored in the execution interval storage means.

(SUPPLEMENTARY NOTE 5) The communication control program according to supplementary note 4, wherein the program for causing a computer, which is provided with a maximum delay time storage means for storing a predetermined maximum delay time, to execute interval timing adjusting processing step which includes, by an interval timing adjusting means, periodically counting the number of system call executions being stored and waiting for execution in the executing system call storage means, and adjusting the time of execution interval of the system call issuance means so that the time until the last issuance of the system call which is waiting for execution has actually been executed may fall within the range of the maximum delay time.

This application claims priority from Japanese Patent Application No. 2009-115048, filed on May 11, 2009, the contents of which are incorporation herein by reference in their entirety.

DESCRIPTION OF THE REFERENCE NUMERALS 1, 1A, 1B a terminal device
10, 10A, 10B a data processor (a part of the terminal device)
11 a communication AP (application) (the first application program)
12, 121, 122 a system call counter means (the system call measurement means and a part of the means for setting interval between system calls)
13, 131, 132 a system call queue means (the system call issuance means, a part of the interval time setting means and a part of the means for setting interval between system calls)
14, 141, 142 a concurrent execution AP (application) (the second application program)
15 a counter summary means (a part of the execution interval control determination means and a part of the means for setting interval between system calls).
16 a delay time determination means (the interval timing adjusting means)
20, 20A a memory storage (a part of the terminal device)
21 a control threshold value management unit (a part of the execution interval control determination means and a part of the means for setting interval between system calls)
22 a basic delay time management unit (the execution interval storage means, a part of the interval time setting means and a part of the means for setting interval between system calls)
23 a queue management unit (the executing system call storage means, a part of the interval time setting means and a part of the means for setting interval between system calls)
24 a maximum queue length management unit (the maximum delay time storage means)

The invention claimed is:

1. A terminal device having an operation system and is capable of using a first application program for use in real time communication and a second application program for another purpose simultaneously on the operation system, the terminal device comprising:
   units configured on a processor for setting interval between system calls which calculates a frequency of system call executions when issuance of the system call to the operation system by the second application program is simultaneously executed during the real time communication by the first application program, and when the execution frequency has exceeded a predetermined threshold, sets an execution interval time between the system calls to a given length of time or more,
   wherein the units for setting interval between system calls comprising:
      a system call measurement units which measures the number of system call executions to the operation system by the second application program;
      an execution interval control determination units which tallies up the number of system call executions measured by the system call measurement units in a predetermined cycle, calculates an execution frequency of the system call based on the sum of the number of system call executions and compares the execution frequency with a threshold value, and determines whether it is necessary or not to control the execution interval time between the system calls based on the comparison result; and
      an interval time setting units which sets the execution interval time between the system calls to the given length of time or more when the determination result by the execution interval control determination units indicates that the execution interval time is needed to be controlled.

2. The terminal device according to claim 1, wherein the units for setting interval between system calls sets the execution interval time between the system calls to a value of the given length of time or more that can prevent deterioration in quality of the first application program in the real time communication caused by the system call of the second application program.

3. The terminal device according to claim 1, wherein the interval time setting units comprising:
   an execution interval storage units which stores a predetermined execution interval time between the system calls;
   a executing system call storage units which stores, by a First-In First-Out method, the issuance of the system call which is waiting for execution; and
   a system call issuance units which stores the issuance of the system call in the executing system call storage units successively, and at the same time, executes the issuance of the system call in order of storage in the executing system call storage units and by the execution interval time stored in the execution interval storage units.

4. The terminal device according to claim 3, comprising:
   a maximum delay time storage units which stores a predetermined maximum delay time; and
   an interval timing adjusting units which periodically counts the number of system call executions being stored and waiting for execution in the executing system call storage units, and adjusts the time of execution interval of the system call issuance units so that the time until the last issuance of the system call which is waiting for execution has actually been executed may fall within the range of the maximum delay time.

5. A communication method used in a terminal device which having an operation system and is capable of using a first application program for use in real time communication and a second application program for another purpose simultaneously on the operation system, the method comprising:
   calculating a frequency of system call executions by a units for setting interval between system calls when issuance of the system call to the operation system by the second application program is simultaneously executed during the real time communication by the first application program; and
   setting an execution interval time between the system calls to a given length of time or more when the execution frequency has exceeded a predetermined threshold,
   wherein the setting the execution interval time includes,
      measuring, by a system call measurement units, the number of system calls executions to the operation system by the second application program;
      tallying up, by an execution interval control determination units, the number of system call executions measured by the system call measurement units in a predetermined cycle, calculating an execution frequency of the system call based on the sum of the number of system call executions and comparing the execution frequency with a threshold value, and determining whether it is necessary or not to control the execution interval time of the issuance of the system call based on the comparison result; and
      setting, by an interval time setting units, the execution interval time between the system calls to the given length of time or more when the determination result by the execution interval control determination units indicates that the execution interval time is needed to be controlled.

6. The communication method according to claim 5, wherein the operation of setting an execution interval time includes,
   setting the execution interval time between the system calls to a value of the given length of time or more that can prevent deterioration in quality of the first application program in the real time communication program caused by the system call of the second application program.

7. The communication method according to claim 5, wherein the operation of setting the execution interval time includes,
   storing, by an execution interval storage units, a predetermined execution interval time between the system calls;
   storing, by a executing system call storage units by a First-In First-Out method, the issuance of the system call which is waiting for execution; and
   storing, by a system call issuance units, the issuance of the system call in the executing system call storage units successively, and at the same time, executing the issuance of the system call in order of storage in the executing system call storage units and by the execution interval time stored in the execution interval storage units.

8. The communication method according to claim 7 comprising:
   providing a maximum delay time storage units which stores a predetermined maximum delay time; and
   periodically counting, by an interval timing adjusting units, the number of system call executions being stored and waiting for execution in the executing system call storage units; and
   adjusting the time of execution interval of the system call issuance units so that the time until the last issuance of the system call which is waiting for execution has actually been executed may fall within the range of the maximum delay time.

9. A non-transitory recording medium who stores a communication control program for causing a computer to execute time interval setting processing operation comprising:
   calculating a frequency of system call executions by a units for setting interval between system calls when issuance of the system call to an operation system by a second application program is simultaneously executed during real time communication by a first application program; and
   setting an execution interval time between the system calls to a given length of time or more when the execution frequency has exceeded a predetermined threshold,
   wherein the program for causing the computer in the time interval setting processing operation to execute:
      a system call measurement processing operation, by a system call measurement units, for measuring the number of system call executions to the operation system by the second application program;
      an execution interval control determination processing operation, by an execution interval control determination units, for tallying up the number of system call executions measured by the system call measurement units in a predetermined cycle, calculating an execution frequency of the system call based on the sum of the number of system call executions and comparing the execution frequency with a threshold value, and determining whether it is necessary or not to control the execution interval time between the system calls based on the comparison result; and
      an interval time setting processing operation, by an interval time setting units, for setting the execution interval time between the system calls to the given length of time or more when the determination result by the execution interval control determination units indicates that the execution interval time is needed to be controlled.

10. The non-transitory recording medium who stores the communication control program according to claim 9, wherein the time interval setting processing operation include,
   setting the execution interval time between the system calls to a value of the given length of time or more that can prevent deterioration in quality of the first application program in the real time communication program caused by the system call of the second application program.

11. The non-transitory recording medium who stores the communication control program according to claim 9, wherein the program for causing a computer in the time interval setting processing operation to execute:
   an execution interval storage processing operation, by an execution interval storage units, for storing a predetermined execution interval time between the system calls;
   a system call issuance storage processing operation, by a executing system call storage units, for storing, by a First-In First-Out method, the issuance of the system call which is waiting for execution; and
   a system call issuance processing operation, by a system call issuance units, for storing the issuance of the system call in the executing system call storage units successively, and at the same time, executing the issuance of the system call in order of storage in the executing system call storage units and by the execution interval time stored in the execution interval storage units.

12. The non-transitory recording medium who stores the communication control program according to claim 11, wherein the program for causing a computer, which is provided with a maximum delay time storage units for storing a predetermined maximum delay time, to execute interval timing adjusting processing operation by an interval timing adjusting units, comprising:
   periodically counting the number of system call executions being stored and waiting for execution in the executing system call storage units; and
   adjusting the time of execution interval of the system call issuance units so that the time until the last issuance of the system call which is waiting for execution has actually been executed may fall within the range of the maximum delay time.

* * * * *